US00RE42969E

(19) United States
(12) Reissued Patent
McCloskey

(10) Patent Number: US RE42,969 E
(45) Date of Reissued Patent: Nov. 29, 2011

(54) PORTABLE TROMMEL

(76) Inventor: James Paschal McCloskey, Ajax (CA)

(21) Appl. No.: 09/687,828

(22) Filed: Oct. 12, 2000

Related U.S. Patent Documents

Reissue of:
(64) Patent No.: 5,819,950
Issued: Oct. 13, 1998
Appl. No.: 08/628,881
Filed: Apr. 5, 1996

(51) Int. Cl.
*B07B 1/22* (2006.01)

(52) U.S. Cl. ..... 209/241; 209/288; 209/420; 209/930; 198/313; 198/317; 198/318

(58) Field of Classification Search ..... 209/240, 209/241, 243, 244, 247, 255, 257, 284, 288, 209/409, 420, 421, 930; 198/313, 314, 315, 198/316.1, 317, 318
See application file for complete search history.

(56) References Cited

U.S. PATENT DOCUMENTS

| | | | | |
|---|---|---|---|---|
| 2,609,115 A | | 9/1952 | Oklejas | |
| 4,031,976 A | | 6/1977 | Lambert | |
| 4,058,198 A | | 11/1977 | O'Neill et al. | |
| 4,303,506 A | | 12/1981 | Finlay | 198/313 X |
| 4,624,357 A | | 11/1986 | Oury et al. | 198/317 X |
| 4,983,280 A | | 1/1991 | Eriksson | 209/420 X |
| 4,997,135 A | | 3/1991 | Zehr | |
| 5,193,971 A | * | 3/1993 | Pettijohn | 414/523 |
| 5,234,564 A | | 8/1993 | Smith | 209/421 X |
| 5,248,042 A | | 9/1993 | Kuhmonen | |
| 5,285,905 A | | 2/1994 | Laprade | |
| 5,332,052 A | | 7/1994 | Carnevale | |
| 5,577,618 A | | 11/1996 | Rafferty | |

FOREIGN PATENT DOCUMENTS

| | | | |
|---|---|---|---|
| CA | 2094518 | 10/1994 | |
| GB | 2175559 | 12/1986 | 209/420 |
| GB | 2200613 A * | 8/1988 | |

OTHER PUBLICATIONS

Appendix A: Re-Tech dated engineering drawing (May 25, 1994), Sales Literature from Re-Tech depicting trommel with two double folding conveyors, Photos of Eliminator Device built Jul. 1984 having serial No. 1R9TE472XRY216016 (Figures 1-11), Figure 12 is a Re-Tech drawing #E-32 depicting double-fold fines stacker option available before Apr. 5, 1995, Figure 13 is Sales Literature published before Apr. 5, 1995 from Re-Tech depicting double-pivoting conveyors in stowed position, Publisher: Re-Tech (a division of Enviroquip Systems Inc.), USA.

(Continued)

*Primary Examiner* — Joseph C Rodriguez
(74) *Attorney, Agent, or Firm* — Schwabe, Williamson & Wyatt, P.C.

(57) ABSTRACT

A portable trommel has a chassis, including support wheels at one end thereof for movement of the trommel. A trommel is rotatably mounted on the chassis and has an input and an output end. A hopper and an input conveyor, for supplying material to be screened to the input end of the trommel, are mounted on the chassis adjacent the input end of the trommel. An output or fines conveyor, for collecting material passing through the trommel screen, is mounted on the chassis, below the trommel. A stockpiling conveyor is mounted on the chassis and has a lower end adapted to receive screened material from the fines conveyor and an upper end for discharging screened material to form a stockpile. The stockpiling conveyor can be in two parts, which can be folded into a retracted position for storage and transportation, and further can be mounted for rotation about a vertical axis to enable an arcuate storage pile to be formed.

20 Claims, 11 Drawing Sheets

OTHER PUBLICATIONS

Appendix B: Royer Industries Inc., Royer 616 MP advertisement, Biocycle Magazine, May 1991 p. 19, Publisher: JG Press, Inc., USA (Figure 1).
Appendix B: Royer Industries Inc., Sales Literature for Royer 616MP depicting a hopper, a rotary trommel, an input means including an upwardly inclined conveyor, 1991, Publisher: Royer Industries Inc., USA (Figures 2-5).
Appendix B: Royer Industries Inc., Royer 616MP advertisement, Biocycle Magazine, Feb. 1993, p. 6, Publisher: JG Press, Inc., USA (Figure 6).
Appendix B: Royer Industries Inc., Royer 616MP article, Biocycle Magazine, Mar. 1993, p. 47, Publisher JG Press, Inc., USA (Figure 7).
Appendix B: Royer Industries Inc., Royer 616MP article, Biocycle Magazine, Sep. 1994, p. 60, Publisher: JG Press, Inc., USA (Figure 8).
Appendix B: Royer Industries Inc., Sales Literature for Royer 616MP depicting the folding feature of the conveyor,Publlsher: Royer Industries Inc., USA (Figure 9), Sep. 1994.
Appendix C: Diamond Z Manufacturing, Diamond Z Device advertisement, Biocycle Magazine Apr. 1995, p. 14, Publisher: JG Press, Inc., USA (Figure 1).
Appendix D: Re-Tech dated engineering drawing (Mar. 2, 1994) (Figure 1) and (Figure 2) as enlarged version, The Landscaper Device sold in the U.S. prior to Apr. 5, 1995, Publisher: Re-Tech (a division of Enviroquip Systems Inc.), USA.
Photograph of a McCloskey Brothers Mfg. Trommel Model MCB 833 including a side-displaced fines stacking conveyor, which was manufactured and publicly sold in, or prior to, Sep. 1993.
Description of the McCloskey Brothers Mfg. Trommel Model MCB 833, Sep. 1993.
Photograph of a McCloskey Brothers Mfg. Trommel Model 621 including a side-displaced fines stacking conveyor, which was manufactured and publicly sold in, or prior to, Apr. 1995.
Description of McCloskey Brothers Mfg. Trommel Model MCB 621, Apr. 1995.
Wildcat Manufacturing Co., Inc. engineering drawing and brief written description, entitled "Wildcat RHC-6-160 Screening Plant," undated, (as submitted in a Protest and referenced in the Declaration of Charles Mehlhaf included below).
Wildcat Manufacturing Co., Inc. engineering drawing and brief written description, WC677, entitled "Wildcat Trommel Screen Model RHC 6-160," undated, (as submitted in a Protest and referenced in the Declaration of Charles Mehlhaf included below).
Wildcat Manufacturing Co., Inc. engineering drawing WC694, entitled "Stacking Conveyor," dated Mar. 14, 1991, (as submitted in a Protest).
Wildcat Manufacturing Co., Inc. engineering drawing WC680, Model Trom Screen 6-160-RHC, Part Name Stacker Conveyor Tail End, dated Feb. 17, 1991, (as submitted in a Protest).
"Description of Wildcat RHC 6-160 Trommel Screening Plant," dated Apr. 1991, Publisher: Wildcat Manufacturing Co., Inc., pp. 207-218, (as submitted in a Protest).
Wildcat Manufacturing Co., Inc. engineering drawing WC658, Model Trom Screen 6-160-RHC, Part Name Reject Conveyor Carriage, dated Jan. 22, 1991, (as submitted in a Protest).
Wildcat Manufacturing Co., Inc. engineering drawing WC662 Model Trom Screen 6-160-RHC, Part Name Stacker Conv. Swing Detail, dated Jan. 29, 1991, (as submitted in a Protest).
Wildcat Manufacturing Co., Inc. engineering drawing WC661, Part Name Stacker Conveyor, dated Jan. 24, 1991, (as submitted in a Protest).
Wildcat Manufacturing Co., Inc. engineering drawing WC1420, Part Name Swing Detail, dated Aug. 8, 1993, (as submitted in a Protest).
Declaration of Charles Mehlhaf regarding U.S. Appl. No. 09/687,828, signed Nov. 10, 2005, pp. 1-5, (as submitted in a Protest).
Exhibit A, attached to the Declaration of Jerry L. Warlow enclosed herewith {the "Warlow Declaration"}, is a photograph of a Re-Tech Elinator trommel vehicle.
Exhibit B, Warlow Declaration, is a photograph of a Re-Tech Eliminator trommel.
Exhibit C, Warlow Declaration, is a photograph of a Re-Tech Eliminator trommel vehicle.
Exhibit D, Warlow Declaration, is a photograph of a Re-Tech Eliminator trommel vehicel.
Exhibit E, Warlow Declaration, is a photograph of a Re-Tech Eliminator trommel vehicle.
Exhibit F, Warlow Declaration, is a photograph of a manufacturing identification plate attached to the Re-Tech Eliminator trommel vehicle of Exhibits A-E.
Exhibit G, Warlow Declaration, is a Re-Tech drawing E-32, dated May 25, 2005, titled "Double-Fold Fines Stacker Option".
Exhibit H is a printed publication of Royer Industries, Inc., titled An Advanced Recycling System—The 616 Mobile Trommel Screen.
Exhibit I is p. 19 from the May 1991 issue of BioCycle magazine.
Exhibit J is p. 6 from the Feb. 6, 1993 issue of BioCycle magazine.
Exhibit K is p. 47 from the Mar. 1993 issue of BioCycle magazine.
Exhibit L is Royer Industries, Inc. drawing D 1402-2680 D, titled 616 MP ASSY.
Exhibit M, Warlow Declaration, is Re-Tech drawing L-01, dated Mar. 2, 1994, titled The Landscaper.
Exhibit N, attached to the Declaration of Joseph E. Musil enclosed herewith (the "Musil Declaration"), a Cedarapids brochure titled "Model 5348-VGF-FS Portable Impact Breaker With Front Swivel Conveyor" vehicle (The "Cedarapids vehicle"), Form No. 13757-IMCO-10-73.
Exhibit O, Musil Declaration, is a page of a Cedarapids parts manual, titled "Hydraulic Swivel Base Parts List No. 8085KAP".
Exhibit P, Musil Declaration, is three pages of a Cedarapids parts manual of a Cedarapids 5460 MATP Plant.
Exhibit Q, Musil Declaration, is titled Portable And Radial Stacking Conveyor Stockpile Tonnage, Form 125630IMCO-9-69.
Exhibit R is a brochure titled Remu. A translation is included.
Protest submitted under 37 C.F.R. Section 1.291(a) on Feb. 11, 2005.
Protest submitted under 37 C.F.R. Section 1.291(a) on Feb. 28, 2005.

* cited by examiner

PORTABLE TROMMEL

Matter enclosed in heavy brackets [ ] appears in the original patent but forms no part of this reissue specification; matter printed in italics indicates the additions made by reissue.

FIELD OF THE INVENTION

This invention relates to trommel equipment. More particularly, it relates to a portable trommel for cleaning and separating various types of material.

BACKGROUND OF THE INVENTION

Trommel equipment is widely used for sorting material by size in various industries including construction, waste disposal, landscaping, and building demolition. It is also used by aggregate producers. Trommel screens are cylindrical in shape, open at both ends, and in use are rotated. The trommel is inclined, so that material naturally tends to travel from the higher end to the lower end. The material to be processed is dumped into the higher end of a trommel screen and rotation causes the material to tumble towards the lower end. Some of the material, the 'fines', falls down through the trommel screen and the balance, the coarse material, is discharged out the lower end.

Portable trommels are known. Conventional portable trommel equipment typically comprises a rotary trommel, an input conveyor, and a fines conveyor. These are mounted together on chassis, which is provided with wheels at one end and a "fifth wheel" at the other, for connection to a conventional tractor unit. The input conveyor serves to feed the trommel with materials that are deposited on it. The fines conveyor collects 'fines' falling through the trommel screen, and can extend the length of the machine from underneath the trommel to a discharge end.

In order to stockpile screened materials or direct them into a transporter container, typically a separate stacking conveyor must be used. This additional conveyor must be positioned accurately relative to the trommel equipment such that it properly receives screened materials from the fines conveyor. The use of a separate stockpiling conveyor results in substantial costs associated with installing and transporting an additional piece of equipment. These costs can result in trommel machines being inconvenient or impractical for many applications.

Once a stockpiling conveyor has been configured for operation with a trommel machine, its position is fixed and it is not usually practical to adjust its position. Hence, the size of a stockpile that it can make is limited. A tractor or loader is then required to remove processed materials from the stockpile at regular intervals. The processed material is transported to a separate ground area for storage or deposited into a truck. This extra step requires the use and operation of costly loading equipment.

By its very nature, a portable trommel is intended to be frequently and readily moved between different locations. With current portable trommels it is often necessary to provide a stockpiling conveyor. This requires transportation of two separate pieces of equipment. Also, setting up the two pieces of equipment and ensuring they are properly aligned can take from 2 to 4 hours. This results in considerable additional cost.

Further, the material stockpile must be continually serviced by loading equipment in order to prevent the pile from exceeding its maximum height and so that the trommel may process a constant amount of material feed. Over a period of a day, a substantial amount of material must be removed from the fixed stockpile area underneath the stockpiling conveyor. In order to maintain operation of the trommel equipment at an efficient level, two tractors or loading units are required.

Accordingly, there is a need for a stockpiling arrangement for a portable trommel machine, which provides a stockpiling facility and reduces equipment and set up costs as much as possible. Preferably, such an arrangement should also operate as a loader and be capable of rapidly changing from stockpiling to depositing processed materials into a truck or other transport vehicle. Finally, there is a need for a trommel machine which can stack a larger volume of material than is currently possible, without substantially interrupting or reducing the efficient operation of the trammel equipment. Finally, any such modification should still enable a portable trommel to be transported readily on ordinary roads, i.e., it should not be of excessive height or width.

SUMMARY OF THE INVENTION

In accordance with the present invention, there is provided a portable trommel comprising:

- a chassis, including support wheels at one end thereof for movement of the portable trommel;
- a trommel rotatably mounted on the chassis and having an input end, an output end, and a trommel screen;
- input means for supplying material to be screened to the input end of the trommel, the input means being mounted on the chassis adjacent the input end of the trommel;
- output means for collecting material passing through the trommel screen, the output means being mounted on the chassis, below the trommel; and
- a stockpiling conveyor mounted on the chassis and having a lower end for receiving screened material from the output means and having an upper end for discharging screened material to form a stockpile, wherein the stockpiling conveyor comprises a first lower part pivotally attached to the chassis and a first upper part, which is pivotally attached to the first lower part, the first lower and the first upper parts being movable between an extended, operational position, in which the stockpiling conveyor extends upwardly and outwardly from the chassis and a retracted position for transportation, in which the first lower part is at an angle to the first upper part and the first upper part extends over the chassis.

The stockpiling conveyor includes a lower part and an upper part, which are movable between an extended, operational position, and a retracted position for transportation. Advantageously, the lower part of the stockpiling conveyor has a lower end mounted to the chassis for rotation about a vertical axis, to enable the stockpiling conveyor to form an arc-shaped stockpile. Preferably, the stockpiling conveyor then includes a collection chute at a lower end thereof for collecting and directing material onto the conveyor belt thereof, and the fines conveyor includes a discharge chute at the output end thereof, which directs material downwardly onto the stockpiling conveyor.

More preferably, the lower end of the lower part is pivotally mounted to the chassis for motion about a horizontal axis, and the portable trommel includes a body extending upwardly from the chassis and including an upper support bracket providing a support point, with the vertical axis of rotation of the stockpiling conveyor extending through the support point, and a support extends between the support point and the stockpiling conveyor for support thereof. The support can comprise an elongate flexible element, for example a chain, attached to the upper part of the stockpiling conveyor.

To enable the conveyor to rotate, the lower part of the stockpiling conveyor is preferably pivotally mounted to a turntable, which is mounted for rotation about the vertical axis. A pair of hydraulic piston and cylinder assemblies, or other drive means, can then be pivotally connected between the chassis and the turntable, for rotation thereof.

Advantageously, the lower and upper parts are pivotally connected, and include an actuation means for displacing the lower and upper parts between the extended and retracted positions. The actuation means can comprise a pair of hydraulic pistons and cylinders assemblies and a corresponding pair of mechanical linkages on either side of the stockpiling conveyor, with each hydraulic piston and cylinder assembly and one mechanical linkage providing a connection between the lower and upper parts of the stockpiling conveyor.

Each mechanical linkage can comprise a first extension member pivotally connected to the lower part of the stockpiling conveyor, a second extension member secured to the upper part of the stockpiling conveyor, a connection member pivotally connected to the first and second extension members, with the respective hydraulic piston and cylinder assembly pivotally connected between the first extension member and the first part of the stockpiling conveyor. Preferably, a support for supporting the lower part of the stockpiling conveyor in the retracted position is then provided.

To handle coarse rejected material, discharged from the output end of the trommel, a rejected material conveyor can be provided. This is preferable pivotally mounted to the chassis, adjacent the output end of the trommel, so as to be movable between an extended or working position and a retracted position. More preferably, this rejected material conveyor, like the stock piling conveyor, comprises a lower part and an upper part, which can be pivoted relative to one another. The lower part is dimensioned so that, when retracted, it extends to the top of the trommel itself, so that the upper part can be pivoted to lie across the top of the trommel. Both to pivot the rejected material conveyor relative to the chassis and to cause the lower and upper parts to pivot relative to one another, appropriate hydraulic mechanisms can be provided. The output end of the trommel is then advantageously fitted with a pair of plates forming a discharge chute, for directing rejected material onto the rejected material conveyor. These plates can be bolted to the chassis, for quick removal for transportation.

In accordance with another aspect of the present invention, there is provided a portable trommel comprising:

a chassis, including support wheels at one end thereof for movement of the trommel;

a trommel rotatably mounted on the chassis and having an input end and an output end and having a trommel screen;

input means for supplying material to be screened to the input end of the trommel, the input means being mounted on the chassis adjacent the input end of the trommel;

output means for collecting material passing through the trommel screen, the output means being mounted on the chassis below the trommel;

a rejected material conveyor, attached to the chassis and extending from the output end of the trommel, for removal of coarse material that has travelled through the trommel; and a stockpiling conveyor mounted on the chassis and having a lower end for receiving screened material from the output means and having an upper end for discharging screened material to form a stockpile;

wherein each of the rejected material conveyor and the stockpiling conveyor is movable between an extended, operational position extending upwardly and outwardly from the chassis, and a retracted position for transportation, the rejected material conveyor and the stockpiling conveyor not extending substantially beyond the chassis in their retracted positions.

BRIEF DESCRIPTION OF THE DRAWINGS

For a better understanding of the present invention, and to show more clearly how it may be carried into effect, reference will now be made, by way of example, to the accompanying drawing which show preferred embodiments of the present invention and in which.

DETAILED DESCRIPTION OF THE INVENTION

Figures 1, 2:
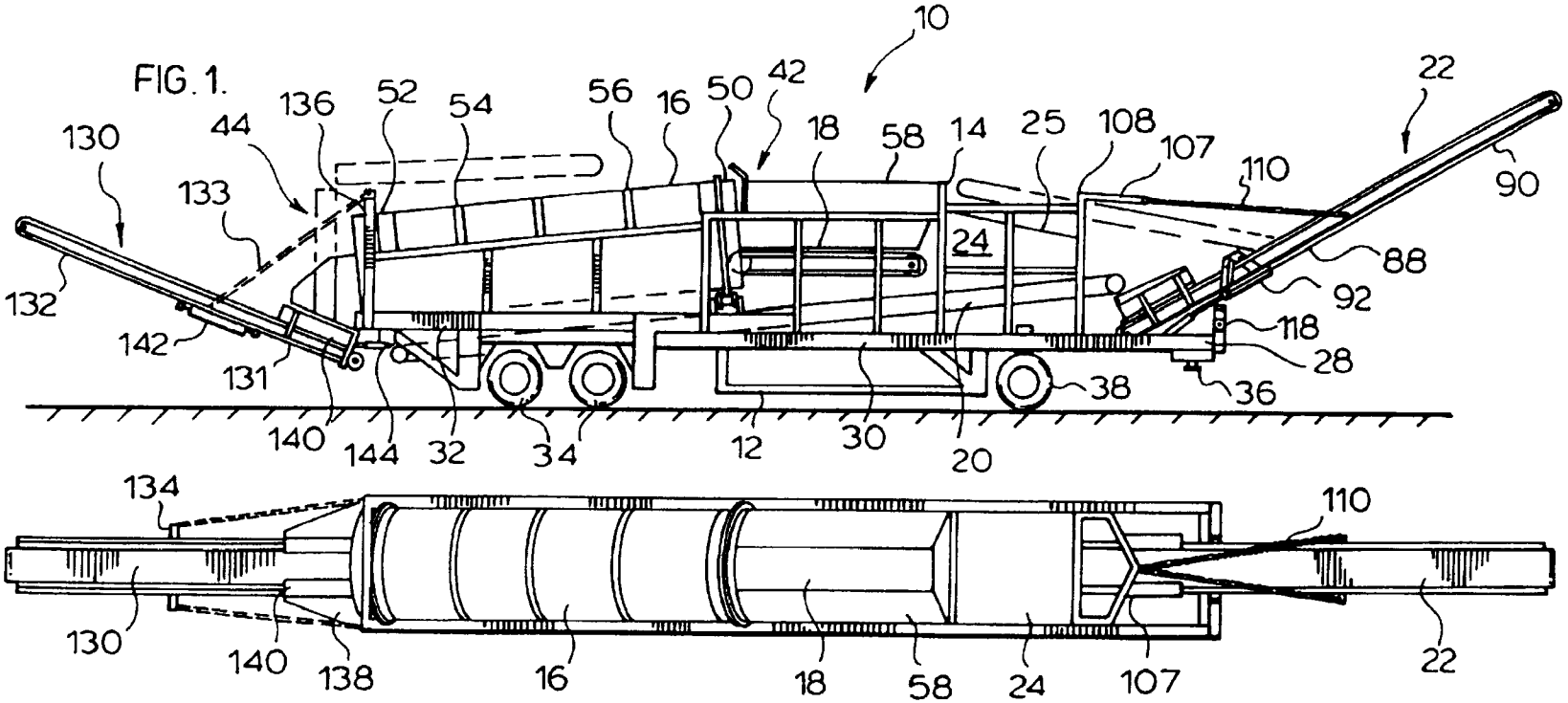
FIG. 1 is a side view of an embodiment of the trommel according to the present invention.
FIG. 2 is a plan view of the trommel of FIG. 1.

Referring first to FIG. 1, a side view of an embodiment of the trommel machine is shown and is generally indicated by the numeral 10. The principle components for the apparatus consist of a chassis 12, a body 14, a rotary trommel 16, an input conveyor 18, an output or fines conveyor 20, a retractable stockpiling conveyor 22, an engine compartment 24, and a control unit, not shown.

Referring to FIGS. 1 and 2, the chassis 12 has a front portion 28, a mid-portion 30, and a discharging or rear portion 32. Fixed wheels 34 are located under the rear portion 32 of the chassis 12. Some views show two axles with wheels 34, while others show just a single axle for wheels 34, to indicate variants of the trommel. As shown, the rear portion 32 has separate side frame elements that extend from and lie on top of the side frame elements for the front and mid portions 28, 30 of the chassis. A fifth wheel or king pin 36 is located at the front portion 28 of the chassis 12 and a set of hydraulic landing wheels 38 is installed adjacent to the fifth wheel 36. The rear portion 32 of the chassis 12 includes an underhanging rear crossbar 40 (FIG. 3) directly underneath the rear portion 32 of the chassis 12.

As shown in FIGS. 1 and 2, the body 14 is mounted on the chassis 12. The body 14 supports the rotary trommel 16 and houses the engine compartment 24. The body 14 comprises a rectangular framework with a plurality of upright frame members and top members. The upright frame members are spaced at regular intervals along the chassis 12. The top members include front overhanging members positioned over the front portion 28 of the chassis 12, members positioned over the engine compartment 24, and members positioned over the input conveyor 18 and the rotary trommel 16. Engine covering screens are provided to house the engine compartment 24 and are secured between four upright frame members and top members. The frame of the body 14 is fabricated from structural tubing and is of all welded construction with the necessary bracing.

The rotary trommel 16, shown in various views in FIGS. 1, 2, 3, 4 and 5, comprises an open feed end 42, an open discharge end 44, and an outer peripheral framework 46 housing a cylindrical trommel screen cage 48, all of which is tilted at an appropriate angle such that the open feed end 42 is raised above the open discharge end 44. The outer peripheral framework 46 comprises an inlet ring 50 and discharge ring 52 of thick steel plate, as well as two circular reinforcing rings 54 and 56 which bolt and clamp the trommel screen cloth 57 to the outside of the trommel screen cage 48. The present trommel 10 utilizes high strength crimped and inter-woven screen cloth 57 of generous gauge such that apertures are appropriately sized for the material to be screened. Five structural longitudinal angle members extend parallel to the axis on the interior of the trommel, to promote tumbling of material. Three freely rotating nylon bristle brushes, not shown, are mounted in known manner in close proximity to the top of the trommel, to engage the outside of the drum face and cloth area for cleaning purposes. Each brush is manually adjustable relative to the cloth face.

The rotary trommel 16 is supported and retained in position by four support rollers and one thrust roller, not shown. The trommel rollers are supported from welded brackets on the chassis 12. A fully enclosed chute, not shown embraces the lower half of the rotary trommel 16 and directs the processed materials onto the fines conveyor 20. The chute has inclined surfaces made from conventional industrial sheeting with a low co-efficient of friction to lessen material build up. A drive means for rotating the trommel screen cage 48 is connected to a heavy plate sprocket, not shown, which is fixed to the inlet ring 50. The drive means principally comprises an hydraulic motor, a smaller drive sprocket and a roller chain. The plate sprocket is driven by means of the roller chain and from the smaller drive sprocket powered by the drum hydraulic motor. The hydraulic motor is conventional and is connected via hydraulic lines to the control unit which is detailed below. The hydraulic motor is mounted on a mounting plate which is welded or otherwise secured to the body 14. An adjustable control valve in the control unit, not shown, provides a variable speed range for the rotation of the trommel screen cage 48.

Referring to FIGS. 1,2,3,4 and 5, the input conveyor 18 forms the base of a feed hopper 58 which is fabricated from four steel plates. The input conveyor 18 is conventional, comprises a belt which is vulcanised in place, and is mounted to the chassis 12 in known manner. The input conveyor 18 is driven by way of a hydraulic motor, not shown, which is connected to the control unit. In known manner, belt support rollers support the belt of the input conveyor 18 and side guide idlers fitted to this belt assist in maintaining true belt alignment. Continuous adjustable rubber flashing 62 is in close contact with the input conveyor.

The input conveyor belt 18 has 4" diameter steel support rollers spaced at 1' centres and the drive pulley is lagged, i.e. provided with a rubber cover. The tail pulley is a wing type, with manual, protected screw take up adjustment. The belt is 36" wide.

Figure 3:
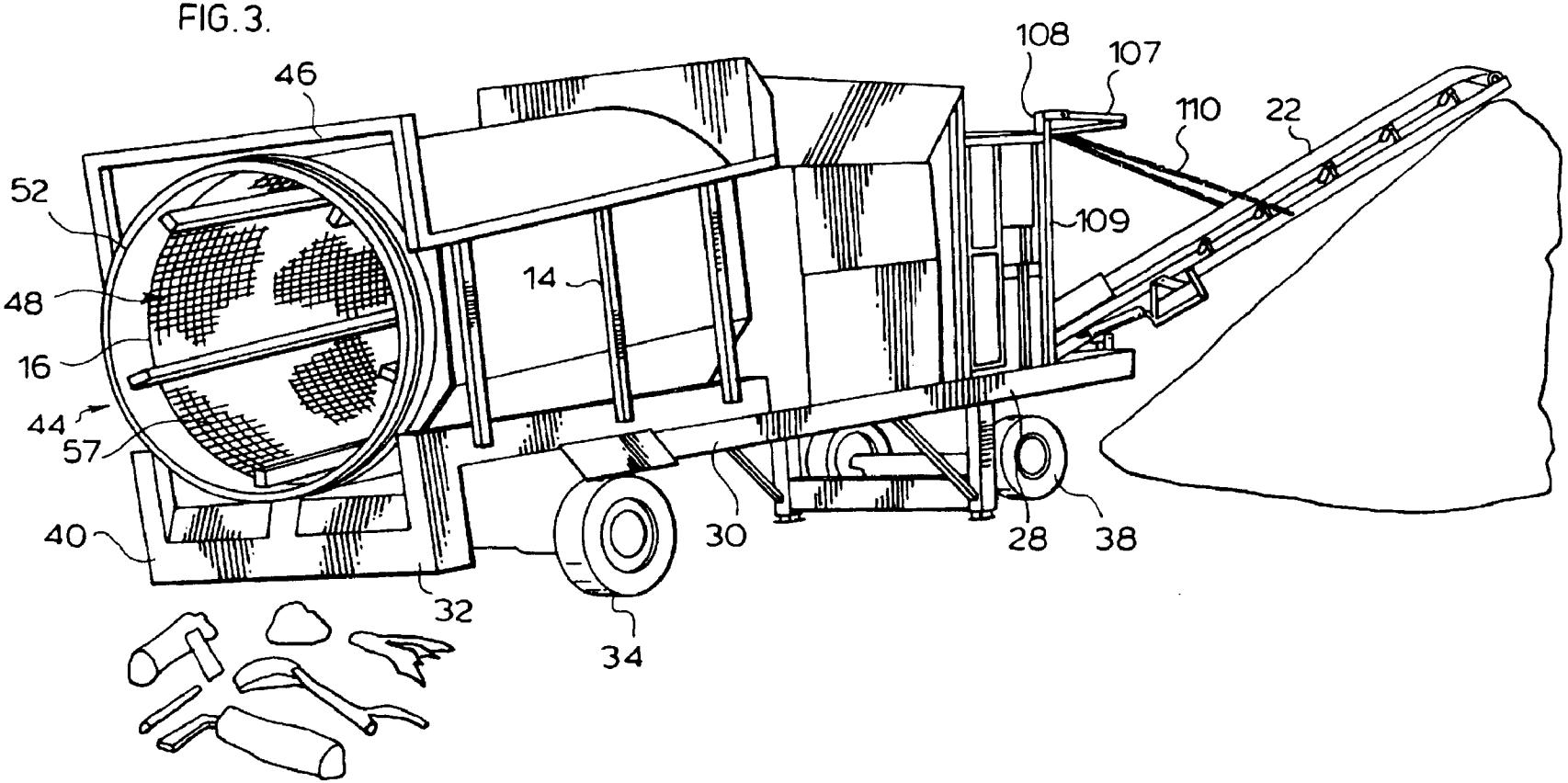
FIG. 3 is a perspective view of a variant of the trommel.

Referring to FIGS. 1, 2, and 3, the fines conveyor 20 located under the rotary trommel 16, is also conventional in structure, comprises a belt which is vulcanised in place, and is mounted to the chassis 12 and body 14 in known manner. An angle frame supports closely spaced standard troughed idlers. The fines conveyor 20 is positioned such that the materials passing through the rotating trommel chute are all collected by the conveyor. The drive pulley is driven by a close coupled hydraulic motor, not shown. The present embodiment contains a pivoting neoprene rubber belt cleaner which is installed under the drive pulley. The length of the fines conveyor 20 is intentionally shorter and its slope rises at a lower rate than conventional fines conveyors. The fines conveyor 20 is inclined at an angle so as to be generally parallel to the axis of the trommel 16. Conventional conveyors are typically longer and inclined at a greater angle, to provide some ability to form a stockpile. The fines conveyor 20 of the present invention is short and low enough for proper integration with a permanently attached stockpiling conveyor 22 as will be described in detail. To accommodate the width of the trommel, the fines conveyor 20 has a 42" wide belt and 4" diameter standard troughed idlers. The drive pulley is lagged, while the tail pulley is wing type with protected screw take up adjustment.

Now, in accordance with the present invention and as shown in FIGS. 1 to 6, the stockpiling conveyor 22 is positioned underneath the fines conveyor 20 so that material from the fines conveyor is deposited on the stockpiling conveyor. In contrast to the input and fines conveyors 18 and 20, the stockpiling conveyor 22, is not of conventional design. Rather, it is mounted for rotation about a vertical axis, is capable of variable inclination by rotation about a horizontal axis and can be folded or collapsed for transportation. The belt for the stockpiling conveyor 22 is a 30' belt, and the conveyor has an angle frame. The belt is supported on 4' diameter standard troughed idlers. Again, the drive pulley is lagged and driven by an hydraulic motor. The tail pulley is wing type with protective screw take up adjustment. As for the fines conveyor 20, a pivoting neoprene rubber belt cleaner is provided under the drive pulley.

Figure 5:
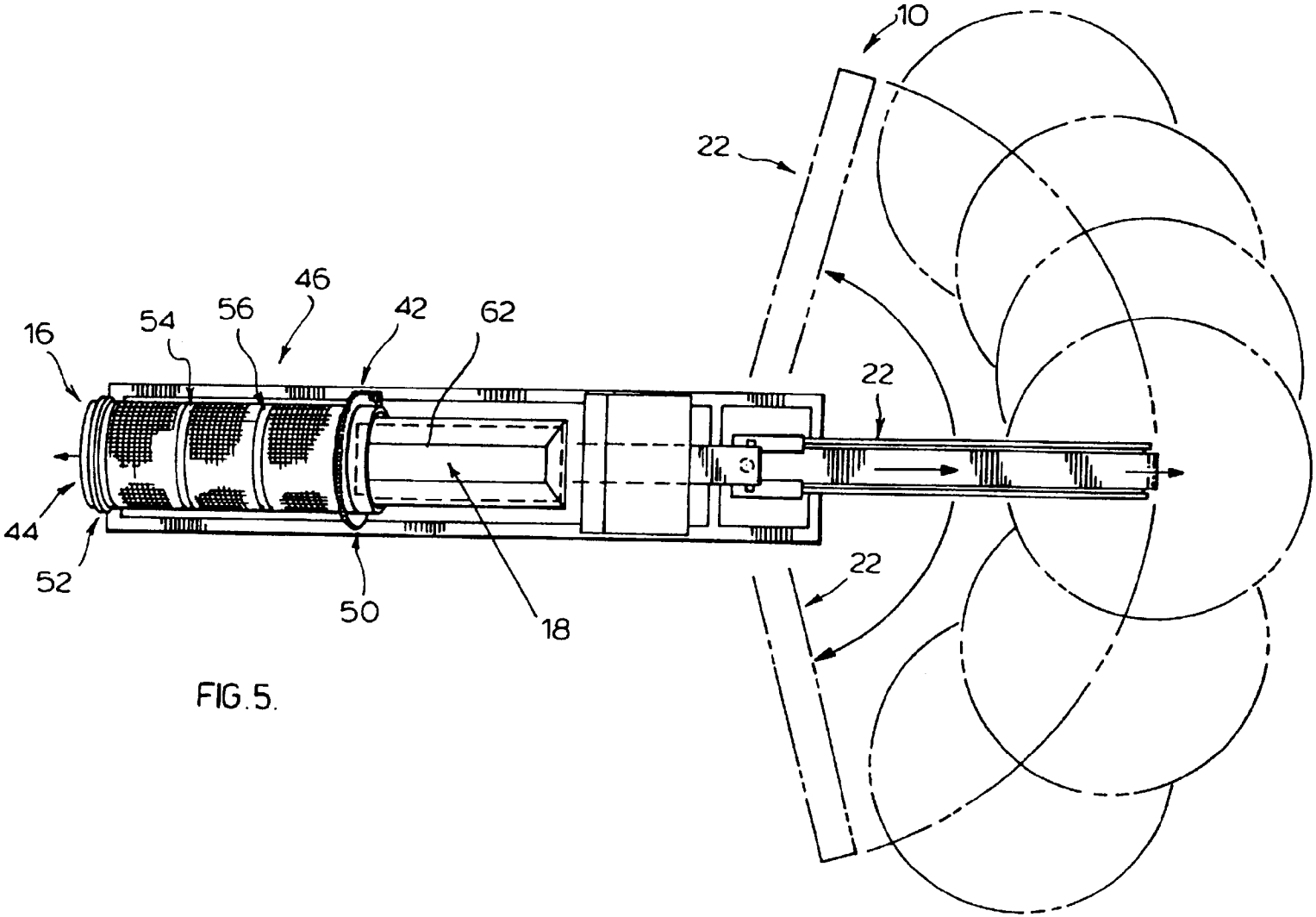
FIG. 5 is a top view of trommel illustrating the radial movement of a stockpiling conveyor.

As shown in FIG. 5, the stockpiling conveyor can be rotated hydraulically to provide increased stockpiling ability. The stockpiling conveyor 22 can be rotated through an approximate arc of 150°.

Figure 6:
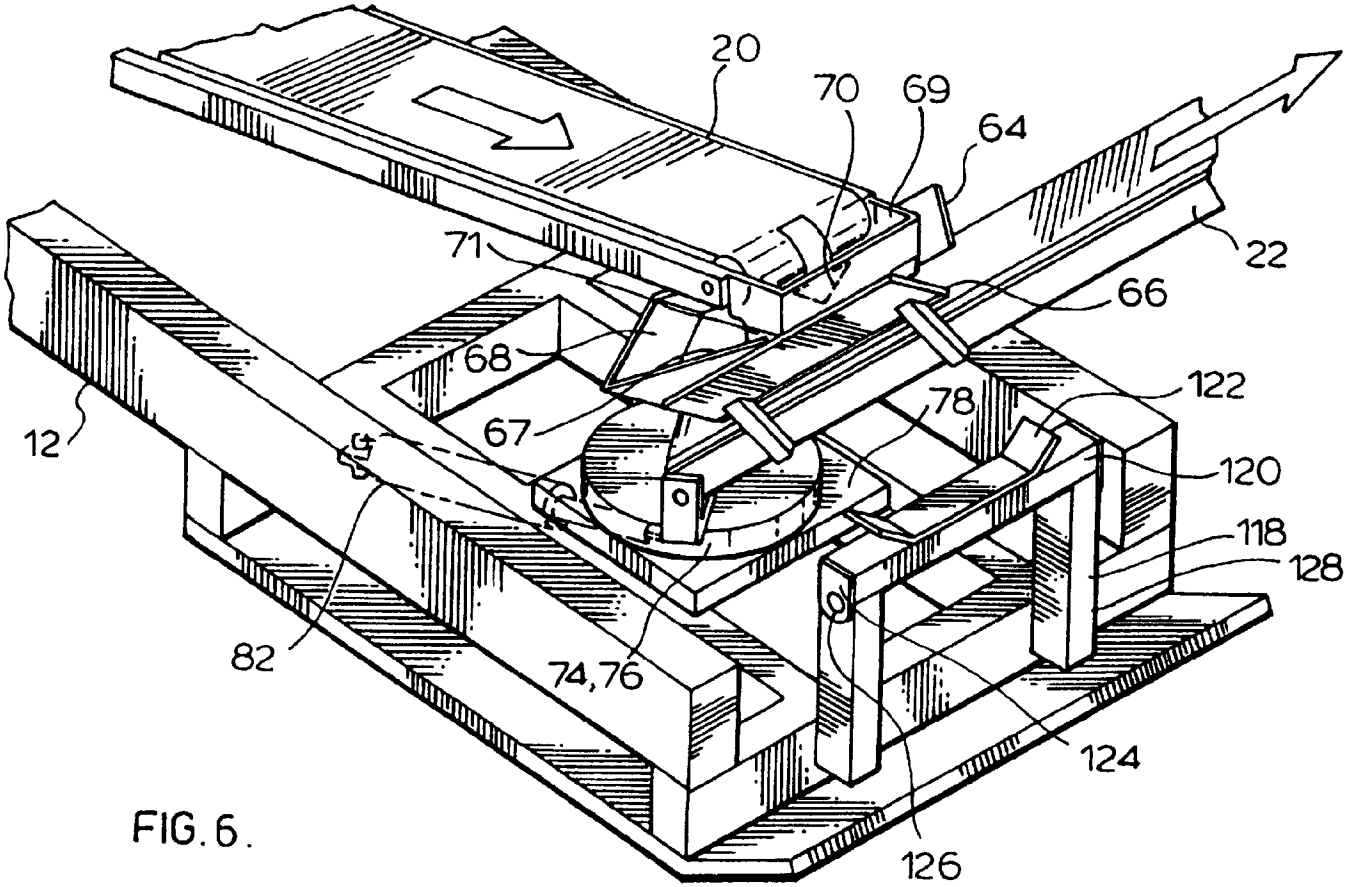
FIG. 6 is a detailed perspective view of the pivot mechanism and hydraulic drive, which causes the stockpiling conveyor to rotate.

FIG. 6 provides a detailed view of the delivery end of the fines conveyor 20, the receiving end of the stockpiling conveyor 22, and a mechanism for effecting radial movement of the stockpiling conveyor 22. To accommodate rotation, the receiving or lower end of the stockpiling conveyor 22 is fitted with two inclined side plates 64 and 66, and an end plate 67, to form a chute. These plates 64, 66, and 67 are attached to the sides and end of the stockpiling conveyor frame by support members attached to the stockpiling conveyor frame. Additionally, a chute extension 68 extends the chute to close to the fines conveyor 20. This chute ensures that screened materials from the fines conveyor 20 are funnelled onto the stockpiling conveyor 22 at any radial position. Additionally, the fines conveyor 20 has an exit chute comprising side plates 69, an end deflector plate 70 and rubber flaps 71, that directs flow of material downwards. The stockpiling conveyor 22 is also fixed to a conventional main pivot shaft 72, a round turntable plate 74, a rectangular support plate 78 and yoke 80, which is then attached to two conventional hydraulic cylinders 82 and 84. The turntable plate 74 is rotatably mounted on a supporting turntable plate 76 fixed to the chassis 12.

Figure 7:
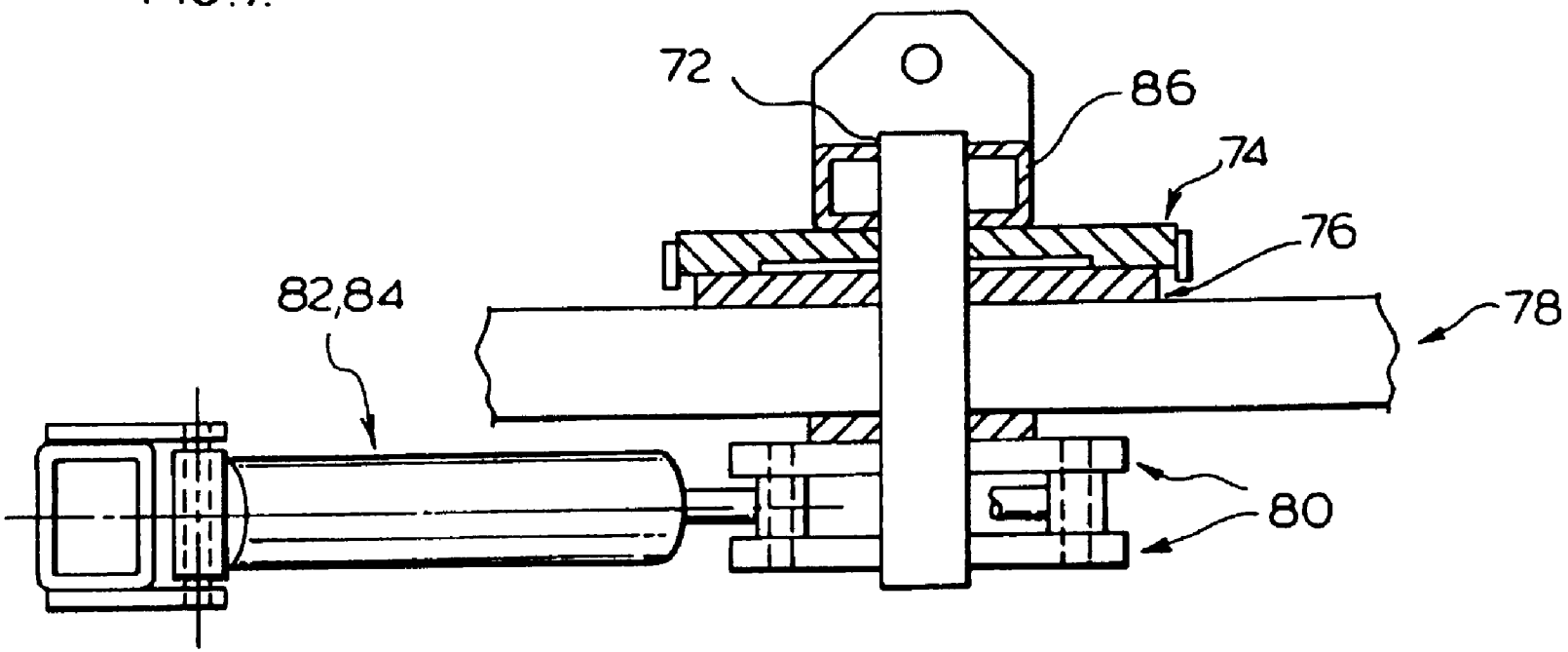
FIG. 7 is a vertical sectional view through the pivot mechanism.
Figure 8:
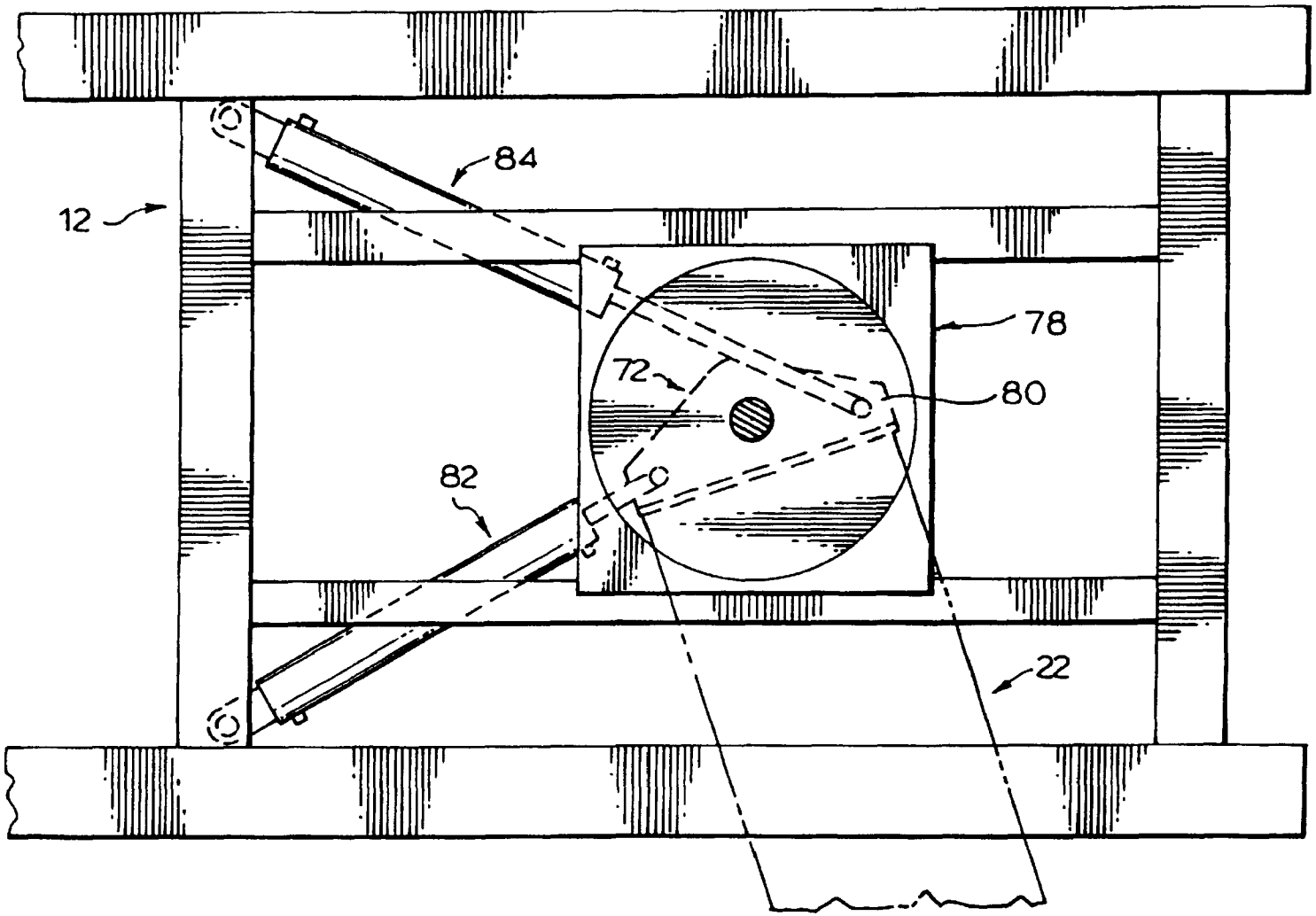
FIG. 8 is a detailed top view of the pivot mechanism and hydraulic drive.

FIGS. 7 and 8 show in more detail how radial movement of the stockpiling conveyor 22 is achieved. The two hydraulic cylinders 82 and 84 are pivotally attached to a cross member of the chassis 12 steel frame. The piston rods of the two hydraulic cylinders 82 and 84 are pivotally attached to ends of a yoke 80. The yoke 80 in turn is attached to the main pivot shaft 72, which is rotatably mounted in a support plate 78. A lower, fixed turntable plate 76 is mounted on the support plate 78, and an upper, rotating turntable plate 74 is mounted above the lower plate 76. A conveyor tail pivot 86 and the upper turntable plate 74 are secured to the upper end of the main pivot shaft 72. This provides a drive means for rotation of the stockpiling conveyor 22.

Figure 9:
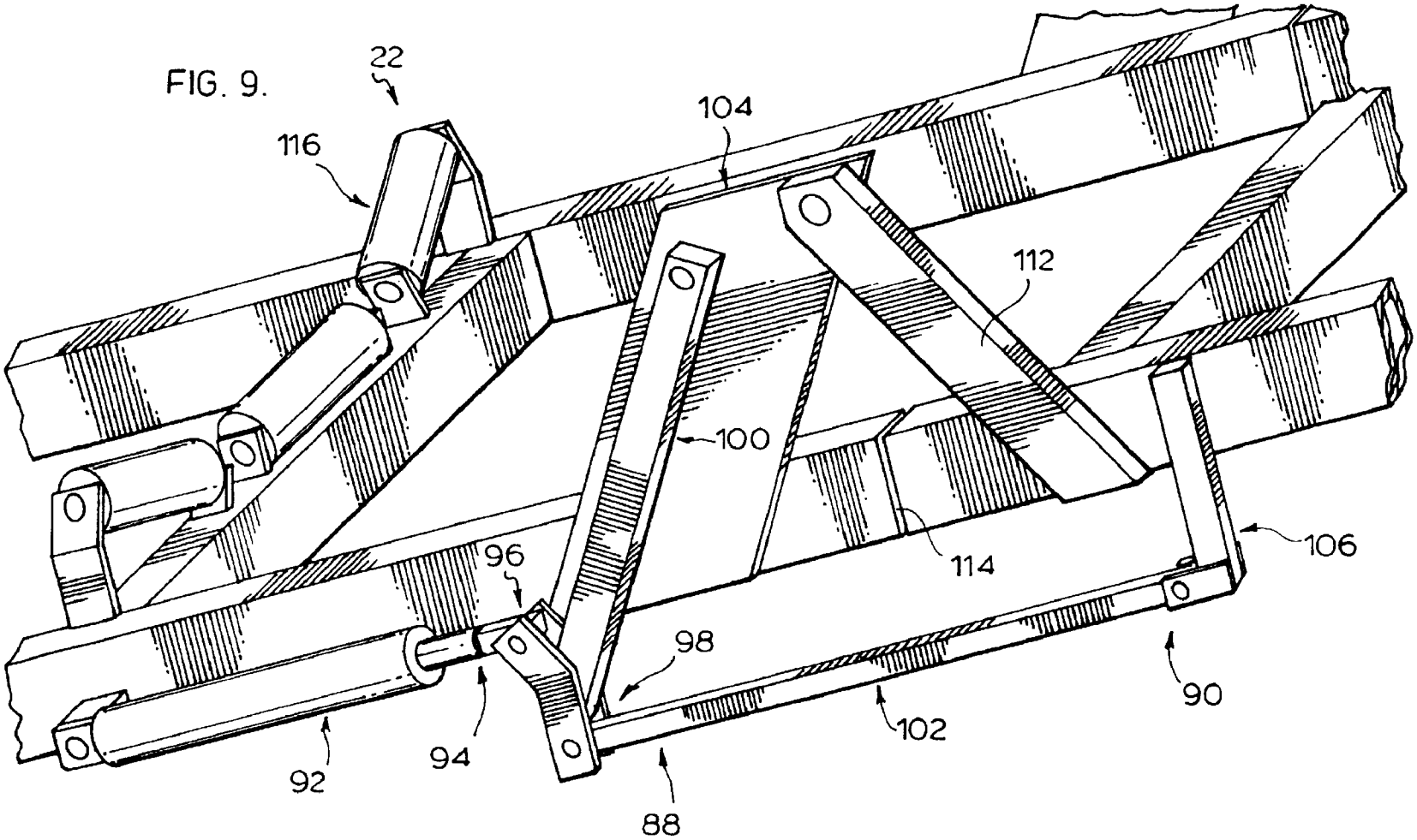
FIG. 9 is a detailed side view of the supporting members of the stockpiling conveyor showing a hinge.
Figure 10:
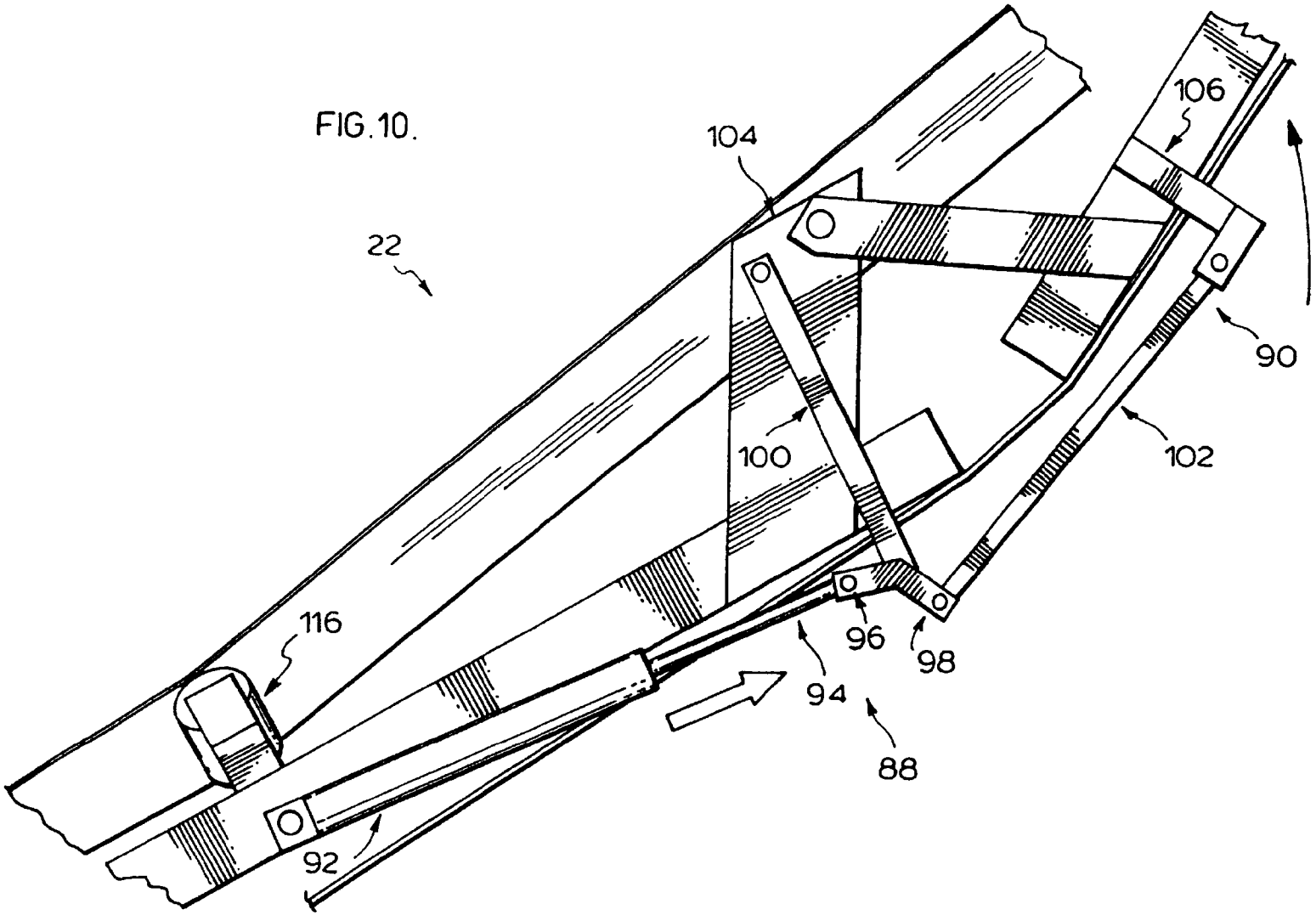
FIG. 10 is a detailed side view of the supporting members of the stockpiling conveyor illustrating how it can be folded for transport.

As shown in FIGS. 1, 9, and 10, the stockpiling conveyor 22 comprises a lower part 88 and an upper part 90 pivotally attached to one another, so that it can be retracted into a folded position for transportation. For this purpose, a folding mechanism is provided, which includes a pair of hydraulic cylinders 92 on either side of the stockpiling conveyor, as an actuation means. For simplicity, the mechanism on one side is described. Each hydraulic cylinder of the hydraulic cylinder pair 92 has one end pivotally attached to the frame of the stockpiling conveyor 22 and the moveable end of its piston rod 94 is attached to a pivot 96 on an intermediate member 98 comprising a pair of plates. The intermediate member 98 is secured to a first extension arm 100 pivotally connected to a connection member 102. The first extension arm 100 is pivotally attached to a fixed plate member 104 which is secured to the frame of the lower part 88 of the stockpiling conveyor 22. The connection member 102 is pivotally connected to a second extension member 106 which is secured to the frame of the upper part 90 of the stockpiling conveyor 22.

As shown in FIGS. 1, 2 and 3, the body 14 of the trommel includes an upper support bracket 107, which is pivotally mounted by pins 108 to vertical frame members 109. A chain 110 extends from the bracket 107 and is pivotally attached to the bracket 107 and to both sides of the upper part 90 of the stockpiling conveyor 22, to support the stockpiling conveyor 22. As shown in FIGS. 9 and 10, the upper part 90 of the stockpiling conveyor has a pair of mounting arms 112 which are pivotally attached to the fixed plate member 104 of the lower part 88. During raising and lowering of the upper part 90, the lower and upper parts 88 and 90, pivot relative to one another about this pivot connection. The lower and upper parts 88 and 90, have frames which abut one another at 114, in the raised or working position of the upper part 90. FIG. 9 also shows troughed rollers 116 of the support and guide structure for the actual conveyor belt.

FIG. 9 shows the upper part of the stacking conveyor 90 in the extended or operational position, ready for operation. To retract or lower the upper part 90 for storage and transportation, the hydraulic cylinders 92 are activated. As shown in FIG. 10, this causes the moveable part of the piston rods 94 to extend. This in turn causes the first extension member 100 to rotate counter clockwise. This in turn drives the connection member 102 to the right and the upper part 90 of the stockpiling conveyor with its respective extension members 100 and 106, are similarly rotated counter clockwise.

Now, in use, the stockpiling conveyor is moved between its retracted and extended positions, when aligned with the chassis of the trommel 10 shown in FIG. 1. As the upper part 90 of the conveyor is raised and folded backwards, this takes the load off the supporting chain 110. This in turn permits the lower part 88 of the conveyor to drop down until it reaches a support 118. Details of the support 118 are shown in FIG. 6. The support 118 comprises a rectangular frame secured to the chassis front portion 28. It has an upper support member 120, on which are welded a pair of locating tabs 122 including inclined end portions for guiding the lower part 88 between them onto the support member 120. The support member 120 is welded to a pair of side plates 124 which are mounted by pins at 126 to vertical members 128.

In use, as the conveyor 22 is lowered, the lower part 88 drops down between the locating tabs 122. The dimensions are such that the lower part 88 simply drops far enough to securely engage the support frame 118. Motion of the lower part 88 then ends, and the upper part continues to fold towards the retracted or storage position, shown in dotted outline in FIG. 1.

Further retraction of the upper part 90 permits the chain 110 and the bracket 107 to fold or collapse downwards. Thus, the bracket 107 pivots until it is hanging down, and the chain 110 is slack. This enables the upper part 90 to fold down, between the vertical frame members 109, until it abuts a roof 25 of the engine compartment 24 (as shown in FIG. 1).

To extend the stockpiling conveyor, this operation is essentially reversed. No elaborate preparation procedures are required. The hydraulic cylinders 92 are activated to cause their piston rods to retract. The upper part of the conveyor then rotates clockwise as viewed in FIGS. 1 and 10, until they reach the fully extended position, as shown in FIGS. 1 and 9. The lower part 88 has then been raised from the support 118, and the weight of the stockpiling conveyor 22 is then taken by the chain 110. It should be noted that the chain is attached to the yoke at a point directly above the axis of the turntable, so that the stockpiling conveyor is adequately supported at all angles. The chain 110 is attached to the conveyor 22, such that the weight of the conveyor 22 maintains the extended configuration.

*The conveyor can be considered to have a gravitational projection or shadow. As shown in FIG. 1, the gravitational projection would extend the length of the extended or deployed conveyor. However, the conveyor when in its retracted or stowed position has a smaller gravitational projection since the second part of the conveyor has folded over the first part of the conveyor.*

Referring to FIGS. 1, 2, 11 and 12, it is preferred for the trommel 10 to include a rejected material conveyor 130. The conveyor 130 is pivotally mounted to the chassis 12 adjacent the outlet end of the trommel 16. As for the stockpiling conveyor, the conveyor 130 comprises a lower part 131 and an upper part 132, pivotally connected together, with the lower part 131 pivotally attached to the chassis. Chains 133 extend between supporting lugs 134 extending out from a junction between the lower and upper parts 131, 132. The upper ends of the chains are attached to upper ends of vertical frame members 136.

To guide rejected or coarse material from the trommel onto the conveyor 130, a chute assembly comprising an upper chute 138 and a lower chute 140 is provided. The upper chute 138 comprises a pair of ¼" thick plastic sheets bolted to the frame adjacent to the outlet end of the trommel. For transportation, these sheets would be removed and stored within the trommel, but they could alternatively be mounted by hinges, to permit them to be folded into a storage or transportation position.

The lower chute 140 comprises a pair of side, guide plates secured to the frame of the conveyor 130.

To move the conveyor 130 between its extended and retracted positions, a pair of hydraulic piston and cylinder assemblies 142 are provided between the lower and upper parts 131, 132. These fold the upper part 132 relative to the lower part 131. To fold the whole conveyor 130 relative to the chassis 12, a pair of hydraulic piston cylinders 144 are provided.

The lower end of the rejected material conveyor 130 has a subframe 150 having a cross member 152 and two upright members 154, as shown in FIG. 10. The members 152, 154 are square section tube, welded together with gussets as shown. The tops of the upright members 154 are provided with bores 156 for pivot pins, for pivotal connection to the chassis 12.

For each of the upright members 154, one side has a pair of plates 158, with bores, for pivotable connection to a piston rod of a hydraulic piston and cylinder 144, the other end of which is pivotally attached to the chassis 12.

Figure 11:
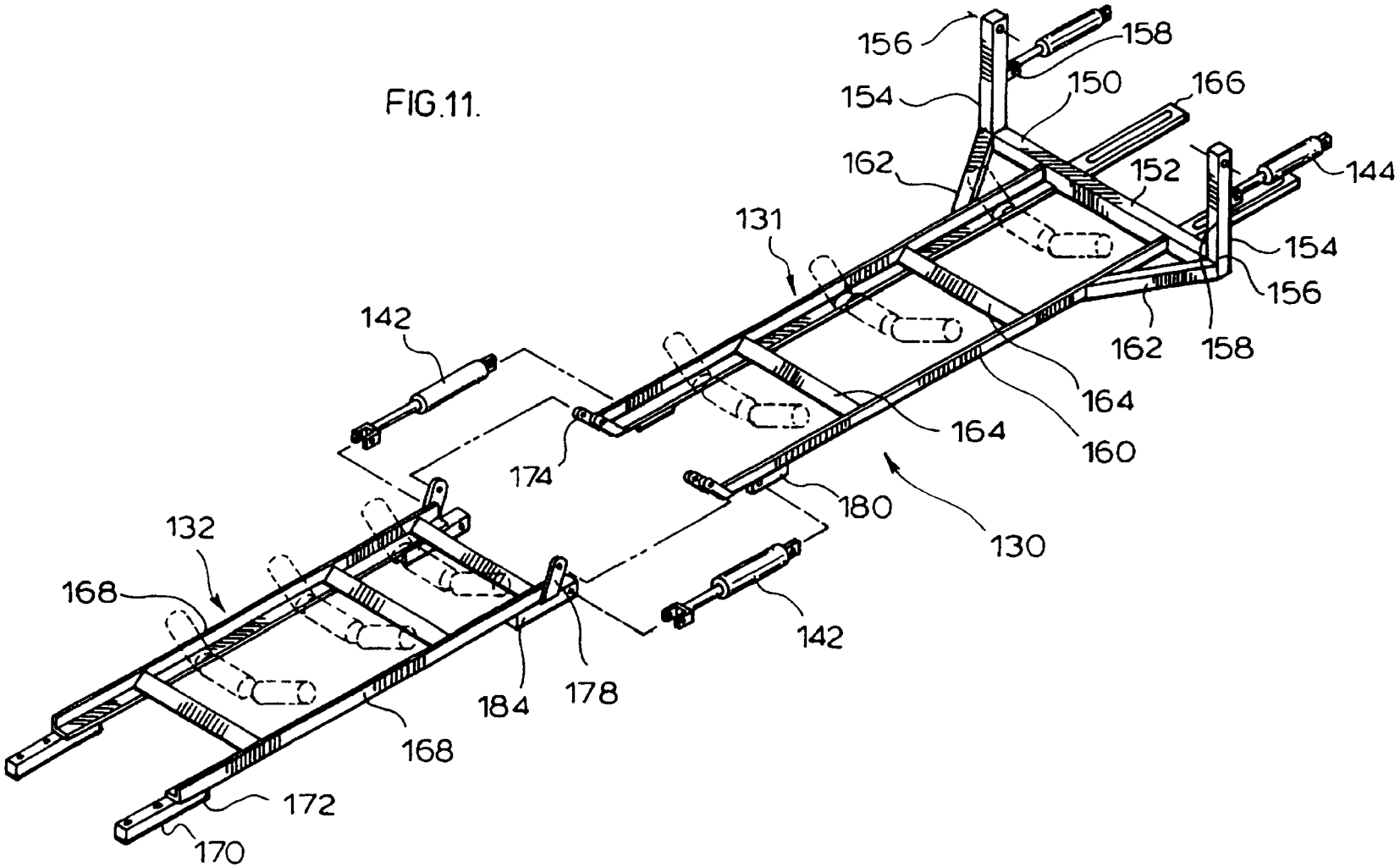
FIG. 11 is a perspective view of a frame for the rejected material conveyor.

Side members 160 of the lower part 131 are welded to the cross member 152 and braced by bracing pieces 162. It will be appreciated that actuation of hydraulic piston cylinders connected to the plates 158 causes the whole rejected material conveyor 130 to pivot about a pivot axis through the bores 156, for movement between extended and retracted positions. As FIG. 11 shows, the frame for the lower part 131 includes angle section cross pieces 164 and extension pieces 166, which like the side members 160 are angle section members. The extension pieces 166 are provided with elongate slots, in known manner to enable an idler roller to be adjustably mounted, to take up slack in the conveyor belt.

FIG. 11 also shows the upper part 132, which has side members 168, as for the lower frame. Extension members 170 and tabs 172 are provided, for mounting of a drive motor. All the side members 160, 168 are drilled, for mounting of idler rollers at appropriate intervals.

As shown, for the lower or tail part 131, the end of each side member 160 is provided with a pair of plates 174 with through bores defining a hinge axis. Correspondingly, the lower ends of the upper side members 168 are provided with plates 178 adapted to be received between the plates 174 and having a corresponding through bore for a pivot pin.

To mount an hydraulic cylinder and piston between each pair of side members 160, 168, a short length of square tube 180 is welded to each side member 160. On either side of the tube 180, there are plates, defining a pivot axis. Correspondingly, a smaller section square tube piece 184 is welded to the end of each side member 168 and is cut at its end to form a pivot point. A hydraulic piston cylinder 142 assembly would be connected between this pivot point and the plates on the tube 180. It can be noted that the tube piece 184 extends down below the plates 178, so that when the hydraulic piston and cylinders are extended to displace the upper and lower parts 131, 132 from the extended position to the retracted position, the hydraulic piston cylinders tend to be displaced away from the side members 160 and more particularly do not interfere with them.

Figure 12:
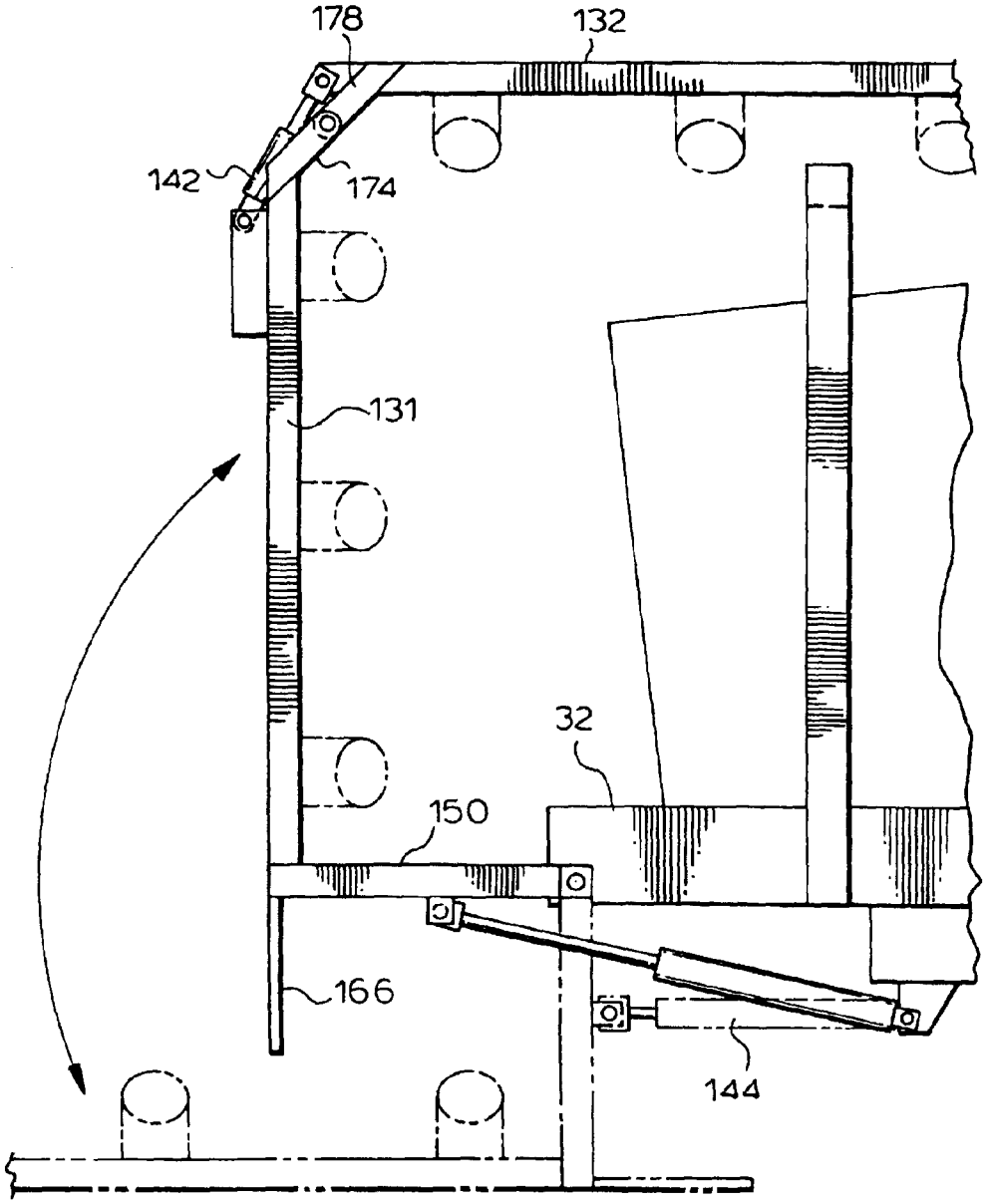
FIG. 12 is a side view showing folding of the rejected material conveyor.

FIGS. 1 and 12 show the conveyor 130 in an extended position, and the retracted transportation position is shown in ghost or a dotted outline.

The rejected material conveyor 130 enables coarse or rejected material to be discharged into a truck or skip for transportation. Alternatively, it simply enables a sizable stockpile of material to be formed, before the material has to be moved. In comparison to the stockpiling conveyor 22, which can form a pile 17'6" high, the discharge end of the conveyor belt is at a height to form a single, conical pile 10' in height. This should be sufficient for most purposes.

Another possible use of the conveyor 130 is as a sorting conveyor or table. For this purpose, the chains 133 would need to be detached, and it may then be necessary to provide additional support for the conveyor. The conveyor 130 would then be arranged generally horizontally. Two or more people on either side of the conveyor 130 would then sort through coarse material travelling along it, so as to pick out certain items. For example, various toxic materials, such as batteries etc. are not acceptable at garbage dumps and the like and must be removed.

The engine compartment 24 is mounted on the front portion 28 of the chassis 12 over the fifth wheel king pin 36 and houses the power unit for the trommel machine 10. Hydraulic motors for the trommel and the conveyor belts are conventional and are connected via hydraulic lines to the control unit and a hydraulic pump within the control unit. The required power can be provided by, for example, any available liquid cooled diesel engine. The engine compartment 24 also includes a hydraulic tank and other standard elements of a hydraulic system to feed the hydraulic pump. Hydraulic power is controlled by hand controlled valves and hose lines to adjust the rotating speed of the rotary trommel 16, the speed of the input conveyor 18, the fines conveyor 20, and the stockpiling conveyor 22. All hand control valves are accessible by an operator from ground level. As noted, the engine compartment 24 has an inclined roof 25, sloped to accommodate the conveyor 22 in the retracted position.

All drive functions are controlled from this position. All valves having definite positioning have detents to keep the drive in the desired mode. For servicing, all hydraulic flow from the oil reservoir can be shut off to each circuit by means of gate valves at the exit point from the reservoir. All valves have a built-in adjustable pressure relief device. The control unit may also have remote control means such as conventional radio control equipment so that the individual operating the loading equipment may be able to instantaneously control the apparatus, to instantaneously adjust the rotation speed of the trommel screen cage 48 for optimal screening effect, to adjust the speed of the input conveyor 18, fines conveyor 20, or stockpiling conveyor 22, and to adjust the radial position of the stockpiling conveyor 22 by activating the hydraulic cylinders 82 and 84.

The trommel machine 10 operates as follows. For transportation the stockpiling conveyor 22 and the rejected material conveyor 130 are folded back into their storage positions.

In their storage positions, the conveyors 22, 130 are essentially folded to an L-shape or the like. This effectively releases the tension on the conveyor belts. Consequently, during transportation, wind action could cause the belts to flap around or to become damaged or entangled on other parts of the equipment. To avoid this, the belts can he maintained in tension in the folded position. This is achieved by providing, for each of the conveyor belts 22, 130, a bracket (not shown) that is located on the inside of the angle of the L-shape. This bracket is bolted or otherwise secured to the frame of the conveyor. The bracket is attached for transportation, and removed and stored before each conveyor is unfolded. This bracket is optional and may not be needed for some applications.

Starting from the folded position, the engine motor is started to operate the hydraulic pump. The hydraulic cylinders 92 are then activated to raise the stockpiling conveyor, as described above, into its operational position through a command at the control unit, and similarly the hydraulic units 142, 144 are operated to extend the conveyor 130 to its operational position. With a screen size appropriate for the application, the rotary trommel 16 and consequently the trommel screen cage 48 are rotated at an appropriate speed by selection at the control unit. The input conveyor 18 is started and rotates in a counterclockwise direction with reference to FIGS. 1 and 4. Material to be screened is loaded into the trommel screen cage 48 by dumping material into the feed hopper 58. This material is transported by the input conveyor 18 into the trommel screen cage 48. The angle of tilt of the trommel screen cage 48 is such that material travels steadily down the rotary trommel 16. Material smaller than the apertures in the screen cloth 57 falls downwardly onto the fines conveyor 20. Larger or coarse material, which cannot fall through the apertures in the screen cloth 57, is tumbled inside the trommel and travels along the length of the trommel until it falls out of the discharge end 44.

The rotational speed of the trommel screen cage 48 may be variably and instantly adjusted for optimal operation of the apparatus. The portable trommel 10 can be operational in this manner within as little as 15 minutes of arrival at a site, due to the integration of the stockpiling and rejected material conveyors 22, 130 into the trommel machine. This setup time is significantly lower that the installation time required to locate and position a separate stockpiling conveyor 22 adjacent a conventional trommel machine, which can be from two to four hours.

Figure 4:
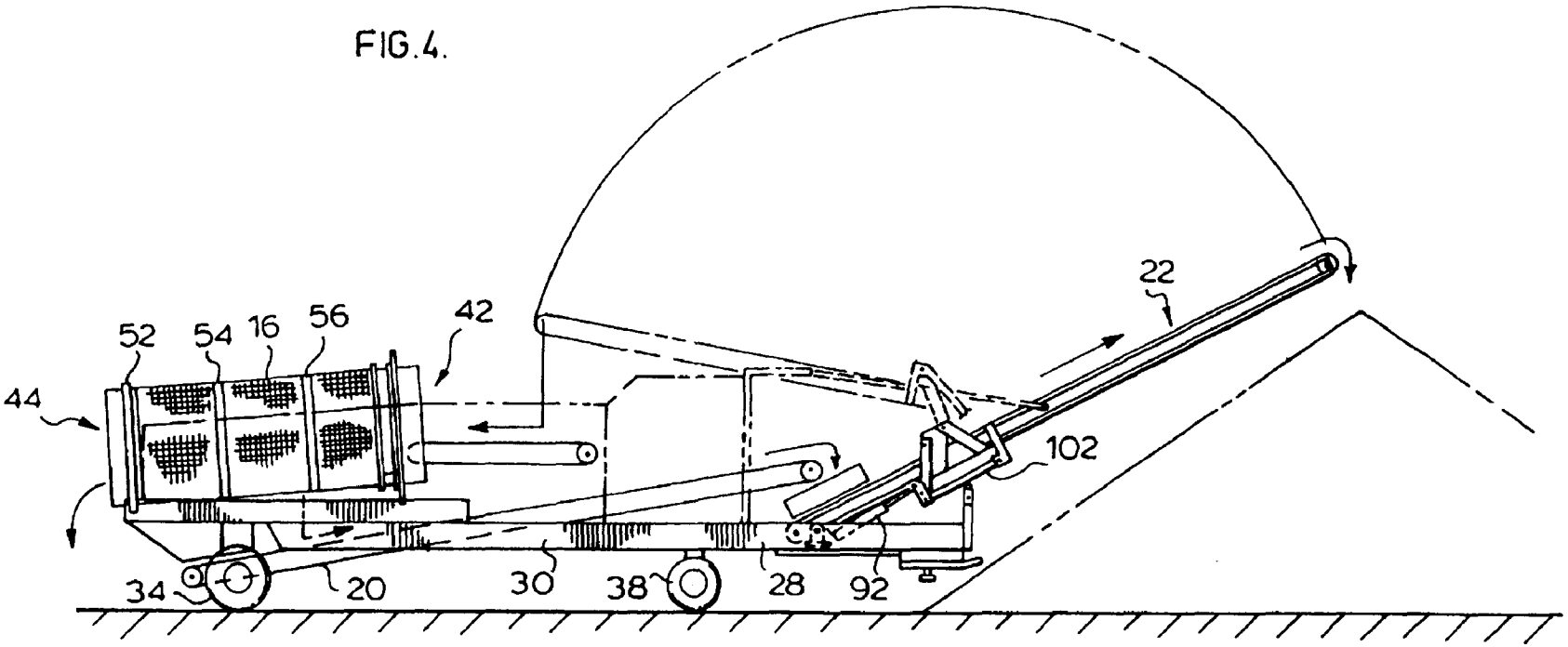
FIG. 4 is a partial schematic side view of the rotating trommel of FIG. 3 and various conveyors of the trommel.

Material which is larger than the apertures in the trommel screen cloth 57 or is somehow prevented from falling downwardly, is eventually ejected from the discharge end of the trommel screen cage 48. This material is removed by the conveyor 130. The fines conveyor 20 carries the screened material, the fines, slightly upwards towards the front end of the trommel machine 10 as shown in FIG. 4, and deposits it onto the stockpiling conveyor 22. The stockpiling conveyor 22 in turn, carries the material upwards at a greater angle past the front end of the trommel machine 10 for final deposit in a stockpile on the ground. The angle of the stockpiling conveyor should be slightly less than the angle of repose of the material being stacked, so as to provide adequate clearance.

As shown in FIG. 5, the stockpiling conveyor 22 can be rotated radially through approximately a 150° arc. This feature allows the operator to interrupt formation of a stockpile and switch the flow into a transport vehicle or truck. The stockpiling conveyor 22 can be swivelled via remote control to load screened materials into a truck within seconds and then can be moved back again to continue stockpiling, again, within seconds. It will be appreciated that this is not possible with a conventional and separate stockpiling conveyor. Here, due to the stability and mass provided by the trommel itself, the stockpiling conveyor can be rotated through a large arc.

Because of the ability of the trommel machine to rotate the stockpiling conveyor 22, the present invention can stockpile considerable amounts of material before its capacity is reached. Multiple stockpiles can be produced by varying the position of the stockpiling conveyor 22 within its operable range. Because the trommel machine eliminates the need for a separate stockpiling conveyor and an additional loading vehicle, it also eliminates associated purchase, operational, and transport costs involved with these extraneous pieces of equipment.

Referring to FIG. 6, the support member 120 is mounted by pins. This is to enable it to be removed, to permit the conveyor 22 to be laid out flat. Thus, during initial construction of the machine, this frame member 120 is omitted. The stockpiling conveyor 22 can then be laid horizontally and attached to the tail pivot 86. This can be achieved with construction workers standing on the shop floor, without the requirement for ladders and/or scaffolding. Similarly, field servicing can be carried out at ground level without the need for any ladders and the like. It also has the advantage that, if it is desired to use a larger, specialized stockpiling conveyor, then the integral stockpiling conveyor 22 can be used as a feed for this. As always, it is then desirable for the conveyor 22 to discharge closely adjacent the separate stockpiling conveyor. For this purpose, the chains 110 can be attached, the support member 120 removed and the conveyor 22 laid out essentially flat, with its head or top end supported adjacent the bottom or tail end of the additional conveyor. This should then minimize or eliminate any spillage.

To enable even larger stockpiles to be formed the additional wheels 38 are provided. Then, when a complete stockpile extending through the full 150° arc has been formed, the portable trommel 10 with its stockpiling conveyor 22 can be moved a sufficient distance to enable a further stockpile to be formed. This does not requires an additional piece of equipment and can be achieved by using the tractor or front end loader that is feeding the device.

The hydraulic landing wheels 38 serve a number of different functions. They are hydraulically raised and lowered using the hydraulic power available. Thus, the wheels 38 are lowered, to lift the trommel off a tractor, and are raised, to lower the trommel onto a tractor for towing.

Once the trommel has been detached from a tractor, as noted above, the wheels 38 ensure that the unit is completely mobile. Any suitable piece of machinery, can be used to move the trommel 10, so that the size of the stockpile created is not limited at all. It is not necessary to reattach a conventional tractor unit to move the trommel 10.

A further function of the wheels 38 is to enable the slope of the trommel 10 to be varied slightly. This can be used to accommodate any variations in the slope of the local ground surface, recognizing that in many locations the ground will be uneven. Alternatively, or as well, it can be used to vary the effective inclination of the rotary trommel 16 itself. The principle variables that effect the operation of a trommel are: the nature of the material being processed; required particle size to be recovered; rotational speed of the trommel; and slope of the trommel. If for any particular application, it is found that material is not travelling fast enough along the trommel, so that an excessive amount of coarse material is being retained for too long within the trommel, then the slope can be increased. Conversely, if it is found that material is travelling to quickly through the trommel, so that fines are being discharged out the end of the trommel, rather than passing through the screen, then the slope can be decreased, to increase the residence time within the trommel 16 and ensure that a greater proportion of the fines passes through the screen.

While preferred embodiments of the invention have been described, it will be appreciated that various changes may be made within the scope of the invention, and such changes are intended to be within the scope of the appended claims.

We claim:

1. A portable trommel comprising:

a chassis, including support wheels at one end thereof for *the* movement of the portable trommel;

a trommel rotatably mounted on the chassis and having an input end, an output end, and a trommel screen;

input means for supplying material to be screened to the input end of the trommel, the input means being mounted on the chassis adjacent the input end of the trommel;

output means for collecting material passing through the trommel screen, the output means being mounted on the chassis, below the trommel; and a stockpiling conveyor mounted on the chassis and having a lower end for receiving screened material from the output means and having an upper end for discharging screened material to form a stockpile, wherein the stockpiling conveyor comprises a first lower part, pivotally attached to the chassis and a first upper part, which is pivotally attached to the first lower part, the first lower and the [fist] *first* upper parts being movable between an extended, operational position, in which the stockpiling conveyor extends upwardly and outwardly from the chassis and a retracted position for transportation, in which the first lower part is at an angle to the first upper part and the first upper part extends over the chassis*, and further wherein the first lower part of the stockpiling conveyor has a lower end mounted to the chassis for rotation about a vertical axis, to enable the stockpiling conveyor to form an arc-shaped stockpile;*

*wherein the lower end of the first lower part is pivotally mounted to the chassis for motion about a horizontal axis, and wherein the portable trommel includes a body extending upwardly from the chassis and including an upper support bracket providing a support point, with the vertical axis of rotation of the stockpiling conveyor extending through the support point, and wherein a support extends between the support point and the stockpiling conveyor for support thereof.*

[2. A portable trommel as claimed in claim 1, wherein the first lower part of the stockpiling conveyor has a lower end mounted to the chassis for rotation about a vertical axis, to enable the stockpiling conveyor to form an arc-shaped stockpile.]

3. A portable trommel as claimed in claim [2] *1*, wherein [in] the input means comprises an input hopper and an input conveyor at the bottom of the input hopper [which ]*, wherein the* input conveyor discharges into the input *end* of the trommel, and wherein the output means comprises a fines conveyor extending along the portable trommel from beneath the trommel to the stockpiling conveyor.

4. A portable trommel as claimed in claim 3, wherein the *lower end of the* stockpiling conveyor includes a collection chute [at a lower end thereof] for collecting and directing material onto the stockpiling conveyor [thereof], and wherein the fines conveyor includes a discharge chute at [the] *an* output end thereof, which directs material downwardly onto the stockpiling conveyor.

[5. A stockpiling conveyor as claimed in claim 2, wherein the lower end of the first lower part is pivotally mounted to the chassis for motion about a horizontal axis, and wherein the portable trommel includes a body extending upwardly from the chassis and including an upper support bracket providing a support point, with the vertical axis of rotation of the stockpiling conveyor extending through the support point, and wherein a support extends between the support point and the stockpiling conveyor for support thereof.]

6. A portable trommel as claimed in claim [5] *1*, wherein the support comprises an elongate flexible element attached to the first upper part of the stockpiling conveyor.

7. A portable trommel as claimed in claim [2] *1*, wherein a turntable is mounted on the chassis, for rotation about [a] *the* vertical axis, and wherein the *first* lower part of the stockpiling conveyor is mounted to the turntable.

8. A portable trommel as claimed in claim 7, which includes drive means for the turntable, for rotation of the stockpiling conveyor.

9. A portable trommel as claimed in claim 8, wherein the drive means comprises a pair of hydraulic piston and cylinder assemblies, pivotally connected between the chassis and the turntable.

10. A portable trommel as claimed in claim [8] *1*, [wherein first] which includes an actuation means for displacing the first lower and first upper parts between the extended and the retracted positions.

11. A portable trammel as claimed in claim 10, wherein the actuation means comprises a pair of hydraulic [pistons] *piston* and [cylinders] *cylinder* assemblies and a corresponding pair of mechanical linkages on either side of the stockpiling conveyor, with each hydraulic piston and cylinder assembly and one mechanical linkage providing a connection between the first lower and first upper parts of the stockpiling conveyor.

12. A portable trommel as claimed in claim 11, wherein each mechanical linkage comprises a first extension member pivotally connected to the first lower part of the stockpiling conveyor, a second extension member secured to the first upper part of the stockpiling conveyor, *and* a connection member pivotally connected to the first and second extension members, with the respective hydraulic piston and cylinder assembly pivotally connected between the first [lower] extension member and the first *lower* part of the stockpiling conveyor.

13. A portable trommel as claimed in claim [12] *1*, which includes a support for the first lower part of the stockpiling conveyor, for support thereof in the retracted position.

14. A portable trommel as claimed in claim [7] *1*, wherein the input means comprises an input hopper and an input conveyor [at the bottom of ] *below* the input hopper [which]*, wherein the* input conveyor discharges into the input end of the trommel, wherein the output means comprises a fines conveyor extending along the portable trommel from beneath the trommel to the stockpiling conveyor, and wherein the fines conveyor is inclined at an angle and has a lower end located beneath the trommel and an upper end located above the lower end of the stockpiling conveyor.

15. A portable trommel as claimed in claim 14, which includes: a power source; a hydraulic pump connected to and run by the power source; a control unit for controlling the power source and hydraulic pump; a first hydraulic motor connected to and run by the hydraulic pump and mounted for driving the trommel; a plurality of hydraulic conveyor drive motors mounted for driving the input conveyor, the fines conveyor and the stockpiling conveyor, and each being connected to the hydraulic pump[.]; *a drive means for rotation of the stockpiling conveyor about the vertical axis, wherein the drive means comprises a hydraulic piston and cylinder assembly; an actuation means for displacing the first lower and first upper parts of the stockpiling conveyor between the extended and the retracted positions, wherein the actuation means comprises a hydraulic piston and cylinder assembly;* and a plurality of connections between the hydraulic pump and the hydraulic piston and cylinder assemblies of the drive means and the actuation means.

16. A portable trommel as claimed in claim [14] *1*, which includes a rejected material conveyor, attached to the chassis and extending from the output end of the trommel, for removal of coarse material that has travelled through the trommel.

17. A portable trommel as claimed in claim 16, wherein *a lower end of* the rejected material conveyor is pivotally attached [at a lower end there of] to the chassis, and wherein [an] *a* hydraulic actuator is provided for displacing the rejected material conveyor between an extended[,] working position, and a retracted position.

18. A portable trommel as claimed in claim 17, wherein the rejected material conveyor comprises a second lower part and a second upper part which are pivotally connected together, and [which includes a further] *wherein the* hydraulic actuator *is* connected between the second lower and second upper parts for displacing the [second lower and second upper parts] *rejected material conveyor* between [an] *the* extended[,] working position, and [a] *the* retracted position[, the rejected material conveyor in a retracted position having the second lower part thereof extending generally upwardly against the output end of the trommel and the second upper part thereof extending generally horizontally across the top of the trommel].

19. A portable trommel as claimed in claim 7, wherein the *first* lower part *of the stockpiling conveyor* is pivotally mounted to the turntable for rotation about [a] *the* horizontal axis.

20. A portable trammel as claimed in claim 16, wherein the rejected material conveyor comprises a second lower part pivotally attached to the chassis for movement about a *second* horizontal axis, and a second upper part pivotally connected to the second lower part for movement about a *third* horizontal axis, whereby the rejected material conveyor can be moved between an extended[,] working position, in which the rejected material conveyor extends outwardly and upwardly form the chassis, and a retracted position, in which the second lower part extends generally upwardly adjacent the output end of the trommel[,] and the second upper part extends over the chassis.

21. A portable trommel as claimed in claim 20, [which includes a body, wherein the input hopper and input conveyor are mounted on the body,] wherein the first upper part of the stockpiling conveyor, in the retracted position thereof, extends above and is supported by the body, and wherein the second upper part of the rejected material conveyor, in the retracted position thereof, extends above the trommel and is supported [on] *by* the body.

22. A portable trommel as claimed in claim [21] *1*, wherein the input [hopper and the input conveyor are provided] *means is* between the trommel and the stockpiling conveyor.

[23. A portable trommel comprising:

a chassis, including support wheels at one end thereof for movement of the trommel;

a trommel rotatably mounted on the chassis and having an input end and an output end and having a trommel screen;

input means for supplying material to be screened to the input end of the trommel, the input means being mounted on the chassis adjacent the input end of the trommel;

output means for collecting material passing through the trommel screen, the output means being mounted on the chassis below the trommel;

a rejected material conveyor, attached to the chassis and extending from the output end of the trommel, for removal of coarse material that has travelled through the trommel; and a stockpiling conveyor mounted on the chassis and having a lower end for receiving screened material from the output means and having an upper end for discharging screened material to form a stockpile;

wherein each of the rejected material conveyor and the stockpiling conveyor is movable between an extended, operational position extending upwardly and outwardly from the chassis, and a retracted position for transportation, the rejected material conveyor and the stockpiling conveyor not extending substantially beyond the chassis in their retracted positions.]

[24. A portable trommel as claimed in claim 23, wherein the input means comprises an input hopper and an input conveyor at the bottom of the input hopper, which input conveyor discharges into the input end of the trommel, and wherein the trommel is mounted with the output end thereof adjacent one end of the chassis, the rejected material conveyor is mounted extending from said one end of the chassis, the input means is mounted on the chassis between the trommel and the other end of the chassis and the stockpiling conveyor is mounted at the other end of the chassis.]

[25. A portable trommel as claimed in claim 24, wherein the stockpiling conveyor comprises a first lower part pivotally attached to the other end of the chassis and a first upper part pivotally attached to the first lower part, which first lower and upper parts are moveable between the extended, operational position, and the retracted position for transportation, and wherein the rejected material conveyor comprises a second lower part pivotally attached to the one end of the chassis and a second, upper part pivotally connected to the second lower part, which second lower and upper parts are movable between the extended, operational position and the retracted position for transportation.]

* * * * *